(12) United States Patent
Abe et al.

(10) Patent No.: US 8,780,116 B2
(45) Date of Patent: Jul. 15, 2014

(54) OBJECT-SHAPE GENERATION METHOD, OBJECT-SHAPE GENERATION APPARATUS, AND PROGRAM

(75) Inventors: Hiroshi Abe, Tokyo (JP); Mohammad Abdul Muquit, Kanagawa (JP)

(73) Assignee: Sony Corporation, Tokyoi (JP)

( * ) Notice: Subject to any disclaimer, the term of this patent is extended or adjusted under 35 U.S.C. 154(b) by 707 days.

(21) Appl. No.: 12/527,290

(22) PCT Filed: Feb. 14, 2008

(86) PCT No.: PCT/JP2008/052908
§ 371 (c)(1),
(2), (4) Date: Aug. 14, 2009

(87) PCT Pub. No.: WO2008/099963
PCT Pub. Date: Aug. 21, 2008

(65) Prior Publication Data
US 2010/0073378 A1    Mar. 25, 2010

(30) Foreign Application Priority Data

Feb. 16, 2007  (JP) ................................. 2007-036766

(51) Int. Cl.
*G06T 11/20* (2006.01)
(52) U.S. Cl.
USPC ........................................ 345/441; 345/418
(58) Field of Classification Search
CPC ................. G06K 2009/00932; G06K 9/00013

USPC .................................................. 345/418, 441
See application file for complete search history.

(56) References Cited

U.S. PATENT DOCUMENTS

2002/0190986 A1 * 12/2002 Fujiwara et al. .............. 345/424

FOREIGN PATENT DOCUMENTS

| JP | 10-243941 | 9/1998 |
|---|---|---|
| JP | 2000-152938 | 6/2000 |
| JP | 2002-175529 | 6/2002 |
| JP | 2002-366935 | 12/2002 |
| JP | 2003-67726 | 3/2003 |
| JP | 2007-219 | 1/2007 |

* cited by examiner

*Primary Examiner* — Kee M Tung
*Assistant Examiner* — Peter Hoang
(74) *Attorney, Agent, or Firm* — Sony Corporation

(57) ABSTRACT

Even in a situation in which an image of the back side of an object cannot be captured, the shape of the object can be generated with high accuracy. For individual images captured from the circumference of an object, projection regions projected in an area from the surface of projection in a projective space to a projective plane that is distant from the surface of projection by a predetermined length in a depth direction in a case where the object reflected in the individual images is projected to the projective space from viewpoint positions of the individual images are detected. A portion common to the individual detected projection regions is extracted.

9 Claims, 16 Drawing Sheets (A)

(B)

FIG. 1
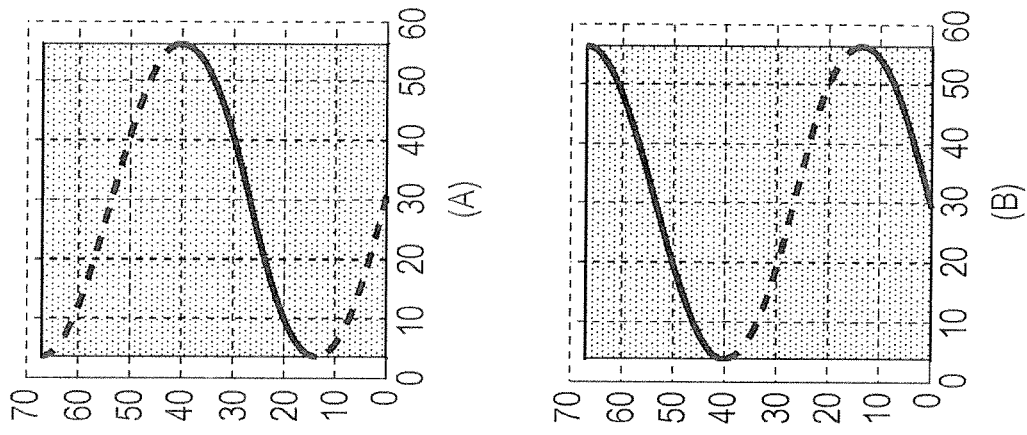
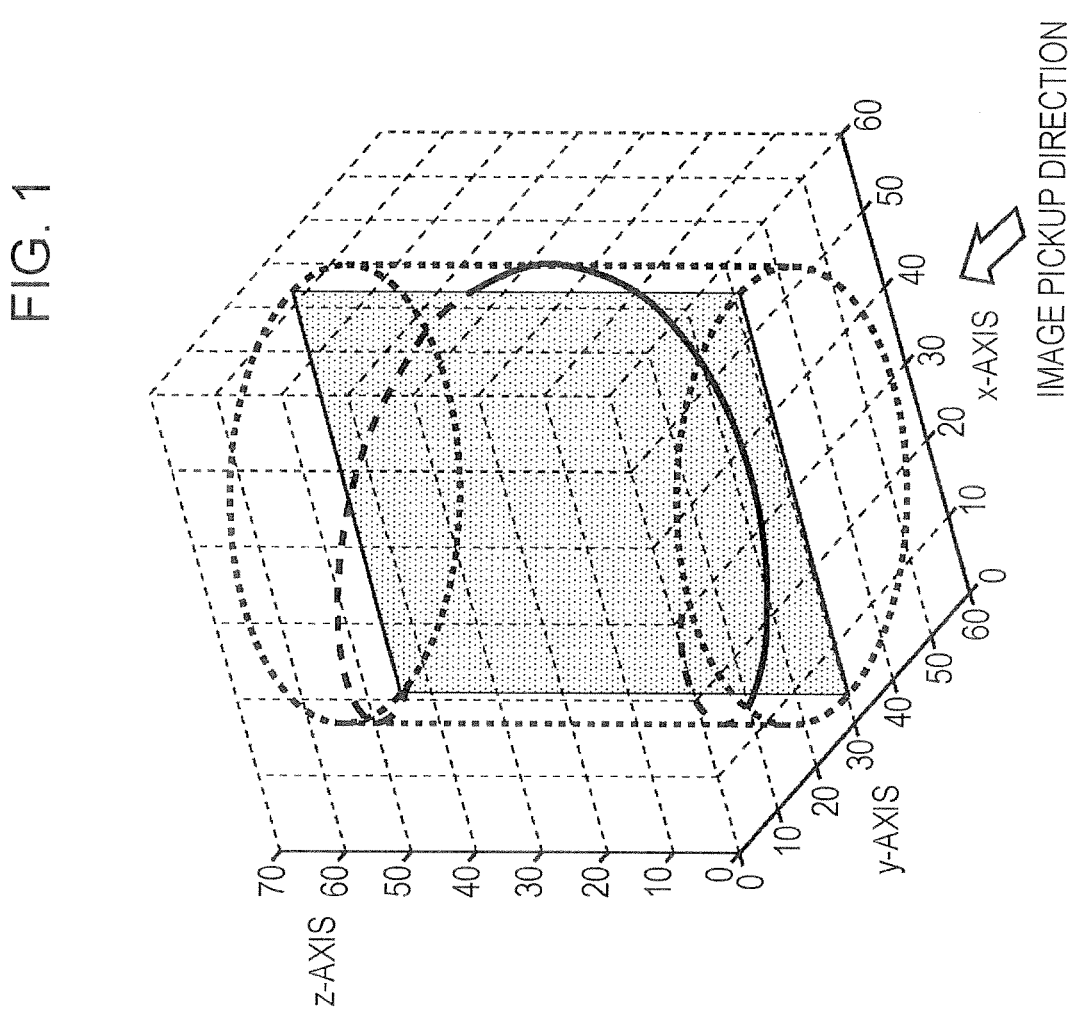

FIG. 6
(A) 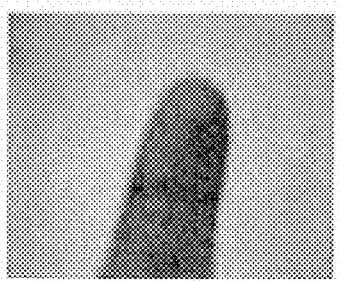
(B) 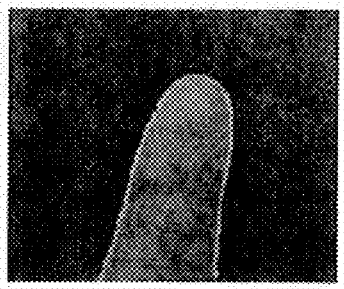
(C) 
(D) 
(E) 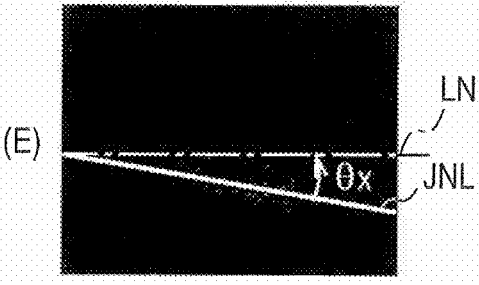

FIG. 7
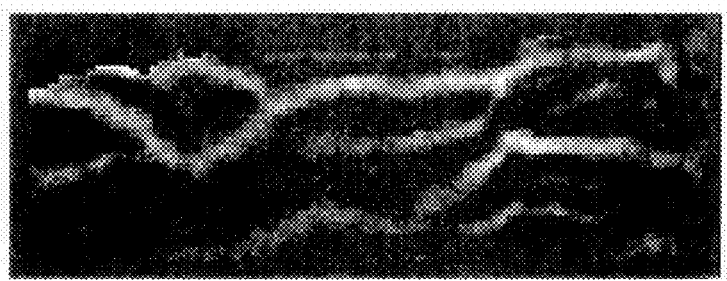
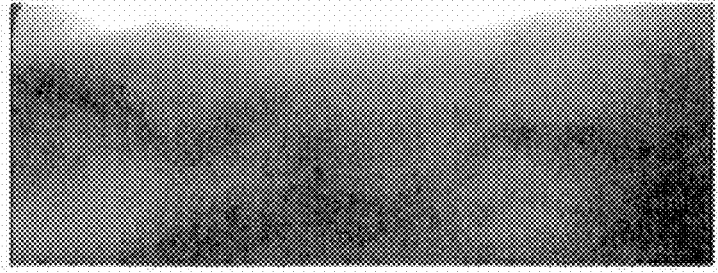

(A)　　　　　　　　(B)

US 8,780,116 B2

OBJECT-SHAPE GENERATION METHOD, OBJECT-SHAPE GENERATION APPARATUS, AND PROGRAM

CROSS REFERENCE TO RELATED APPLICATIONS

This application is related to and claims the benefit of priority from Japanese Patent Application No. PCT/JP2008/052908, filed on Feb. 14, 2008, the contents of which are incorporated herein by reference.

TECHNICAL FIELD

The present invention relates to an object-shape generation method, an object-shape generation apparatus, and a program, and is suitably applied, for example, to biometrics authentication.

BACKGROUND ART

Biometrics authentication is a method for identifying a person by using an identification target of the living body of the person. Blood vessels of a finger are one identification target of a living body.

For example, an authentication apparatus that generates a three-dimensional image by combining images of different sides of a fingertip and uses the three-dimensional image as an identification target has been suggested (for example, see Patent Document 1).

Patent Document 1: Japanese Unexamined Patent Application Publication No. 2002-175529.

Incidentally, an object-shape generation method called a view-volume intersection method (Shape From Silhouette method) exists. The view-volume intersection method is a method for generating, in accordance with images of an object from a plurality of viewpoints, positional information of a camera, and the like, the shape of the target object by causing a region in which all the silhouettes in the individual images intersect with each other within a target space to remain as an object region.

When a three-dimensional blood vessel image is generated using the view-volume intersection method, compared with a two-dimensional blood vessel image (entire-circumference development image), the number of parameters serving as identification targets increases. Hence, it is considered that the authentication accuracy improves.

However, portions of a living body other than blood vessels are not hollow and are occupied by individual tissues such as fat. Therefore, for example, as shown in FIG. 1, an optical image pickup camera might not be able to project a blood vessel portion existing on the back side of an image pickup surface.

In this case, with the view-volume intersection method, a blood vessel portion on the back side of the image pickup surface that is not projected to the image pickup surface is not a region in which all the silhouettes in individual images intersect with each other within a target space. Thus, the region does not remain as an object region. As a result, there is a problem in that a shape different from that of the actual blood vessel may be generated.

DISCLOSURE OF INVENTION

The present invention has been made taking into account the above-described points and provides an object-shape generation apparatus, an object-shape generation method, and a program that are capable of generating the shape of an object with high accuracy even in a situation in which an image of the back side of the object cannot be captured.

In order to achieve the object, an object-shape generation method according to the present invention includes a first step of detecting, for individual images captured from the circumference of an object, projection regions projected in an area from the surface of projection in a projective space to a projective plane that is distant from the surface of projection by a predetermined length in a depth direction in a case where the object reflected in the individual images is projected to the projective space from viewpoint positions of the individual images; and a second step of extracting a portion common to the individual detected projection regions.

In addition, an object-shape generation apparatus according to the present invention includes a work memory; and an image processing unit that executes image processing by using the work memory. The image processing unit detects, for individual images captured from the circumference of an object, projection regions projected in an area from the surface of projection in a projective space to a projective plane that is distant from the surface of projection by a predetermined length in a depth direction in a case where the object reflected in the individual images is projected to the projective space from viewpoint positions of the individual images, and extracts a portion common to the individual detected projection regions.

Furthermore, a program according to the present invention causes a control unit controlling a work memory to execute processing including detecting, for individual images captured from the circumference of an object, projection regions projected in an area from the surface of projection in a projective space to a projective plane that is distant from the surface of projection by a predetermined length in a depth direction in a case where the object reflected in the individual images is projected to the projective space from viewpoint positions of the individual images, and extracting a portion common to the individual detected projection regions.

As described above, according to the present invention, instead of extracting a portion common to silhouette regions projected in the deepest area of the projective space as a stereoscopic image of a blood vessel, a portion common to silhouette regions projected to an area from the surface of projection in the projective space to a projective plane that is distant from the surface of projection by a predetermined length in the depth direction is extracted as a stereoscopic image of a blood vessel. Thus, the view volume can be extracted while attention is paid to a surface portion of an object serving as an image pickup target. As a result, an object-shape generation method, an object-shape generation apparatus, and a program that are capable of generating the shape of an object with high accuracy even in a situation in which an image of the back side of the object cannot be captured can be realized.

BRIEF DESCRIPTION OF DRAWINGS

FIG. 1(A) is a schematic diagram showing an image pickup direction side (the front side of an object) for explaining a problem in a view-volume intersection method, and FIG. 1(B) is a schematic diagram showing a side opposite the image pickup direction side (the back side of the object) for explaining the problem in the view-volume intersection method.

FIG. 6 is a schematic diagram for explaining calculation of a rotation correction amount.

FIG. 7 is a schematic diagram showing images before and after embossing processing is performed.

BEST MODES FOR CARRYING OUT THE INVENTION

Hereinafter, an embodiment to which the present invention is applied will be explained in detail with reference to the drawings.

Figure 2:
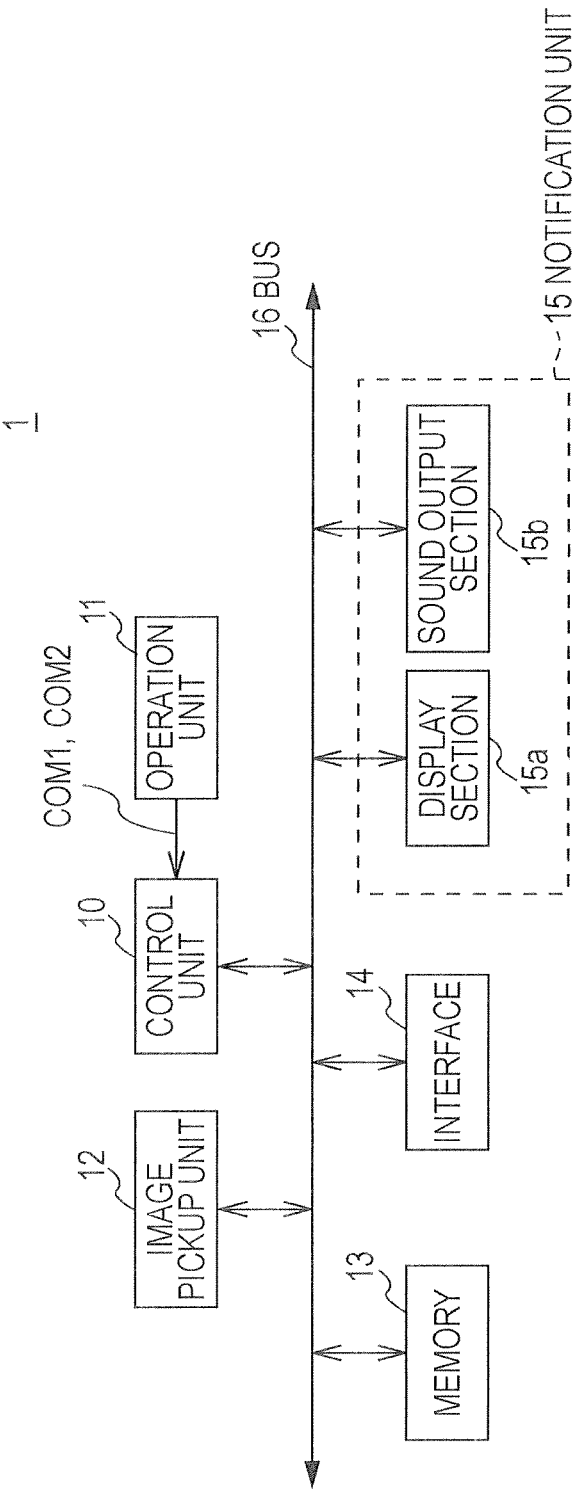
FIG. 2 is a block diagram showing the configuration of an authentication apparatus according to the embodiment.

(1) Entire Configuration of Authentication Apparatus According to this Embodiment FIG. 2 shows the entire configuration of an authentication apparatus 1 according to this embodiment. The authentication apparatus 1 is configured by connecting each of an operation unit 11, an image pickup unit 12, a memory 13, an interface 14, and a notification unit 15 to a control unit 10 through a bus 16.

The control unit 10 is configured as a computer including a CPU (Central Processing Unit) controlling the entire authentication apparatus 1, a ROM (Read Only Memory) in which various programs, setting information, and the like are stored, and a RAM (Random Access Memory) as a work memory for the CPU.

An execution command COM1 for a mode in which blood vessels of a user to be registered (hereinafter, this will be referred to as a registrant) is registered (hereinafter, this will be referred to as a blood vessel registration mode) or an execution command COM2 for a mode in which identification of a registrant is determined (hereinafter, this will be referred to as an authentication mode) is supplied from the operation unit 11 to the control unit 10, in accordance with a user operation.

The control unit 10 is configured to determine, in accordance with the execution command COM1 or COM2, a mode to be executed, control the image pickup unit 12, the memory 13, the interface 14, and the notification unit 15 in an appropriate manner in accordance with a program corresponding to the determination result, and execute the blood vessel registration mode or the authentication mode.

The image pickup unit 12 adjusts the position of a lens in an optical system, the aperture of a diaphragm, and the shutter speed (exposure time) of an image pickup element, in accordance with an exposure value (EV (Exposure Value)) specified by the control unit 10.

The image pickup unit 12 also performs A/D (Analog/Digital) conversion of image signals, as image pickup results at the image pickup element, sequentially output from the image pickup element at predetermined intervals, and transmits image data obtained as the conversion results to the control unit 10.

Furthermore, the image pickup unit 12 drives a near infrared ray light source during a period of time specified by the control unit 10, and applies near infrared rays, which are specifically absorbed by blood vessels, to a position specified as an image pickup target (hereinafter, this will be referred to as an image pickup position).

In a case where a living body portion is placed at the image pickup position, a near infrared ray passing inside the living body portion is incident, as light that projects blood vessels, to the image pickup element by the optical system and the diaphragm, and an image of the blood vessels inside the living body is formed on an image pickup surface of the image pickup element. Consequently, in this case, the blood vessels are reflected in an image obtained as the image pickup result by the image pickup unit 12.

The memory 13 includes, for example, a flash memory. The memory 13 is configured so that data specified by the control unit 10 is stored in the memory 13 or read from the memory 13.

The interface 14 is configured to transmit and receive various data to and from an external apparatus connected through a predetermined transmission line.

The notification unit 15 includes a display section 15a and a sound output section 15b. The display section 15a displays, on a display screen, contents based on display data supplied from the control unit 10 in the form of letters or diagrams. Meanwhile, the sound output section 15b is configured to output, from a speaker, sound based on sound data supplied from the control unit 10.

(2) Blood Vessel Registration Mode

Next, the blood vessel registration mode will be explained. When determining the blood vessel registration mode as a mode to be executed, the control unit 10 changes the operation mode to the blood vessel registration mode and causes the notification unit 15 to issue a notification indicating that there is a need to place a finger at an image pickup position and to rotate the finger on the curved ventral surface of the finger. At the same time, the control unit 10 causes the image pickup unit 12 to operate.

Figure 3:
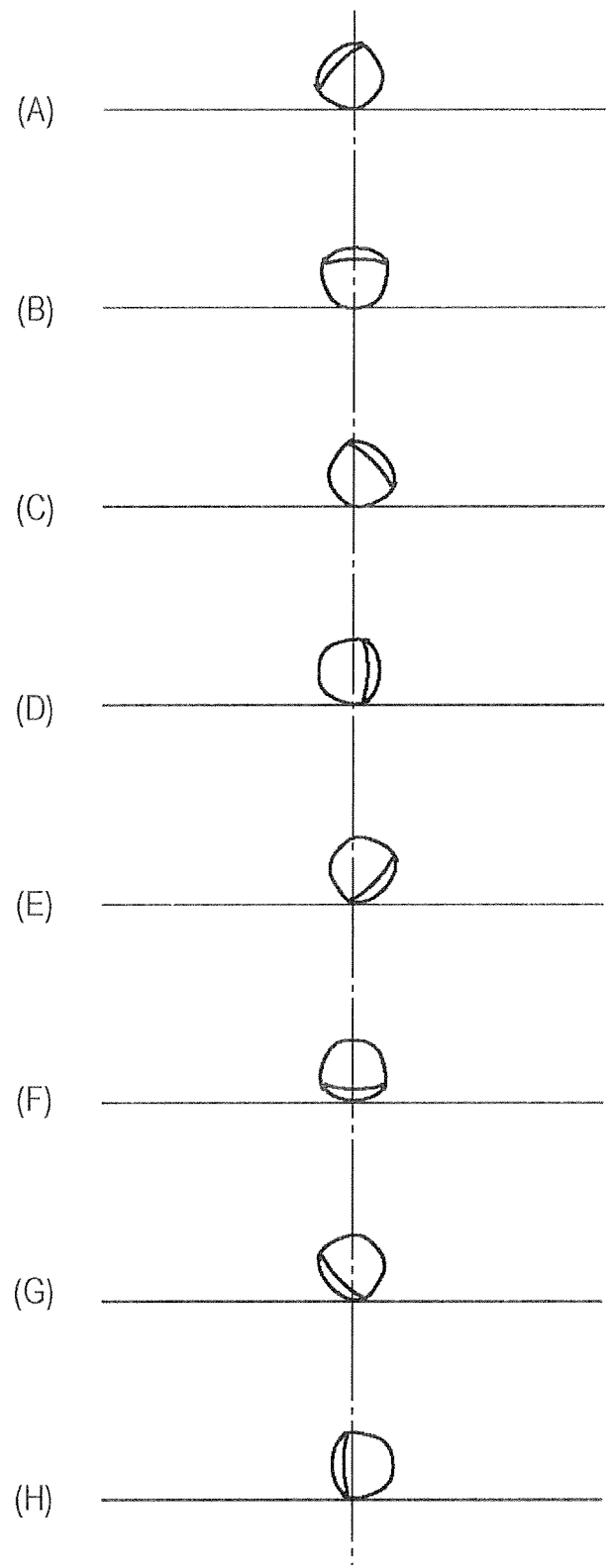
FIG. 3 is a schematic diagram showing the transition of the state of a rotating finger.
Figure 4:
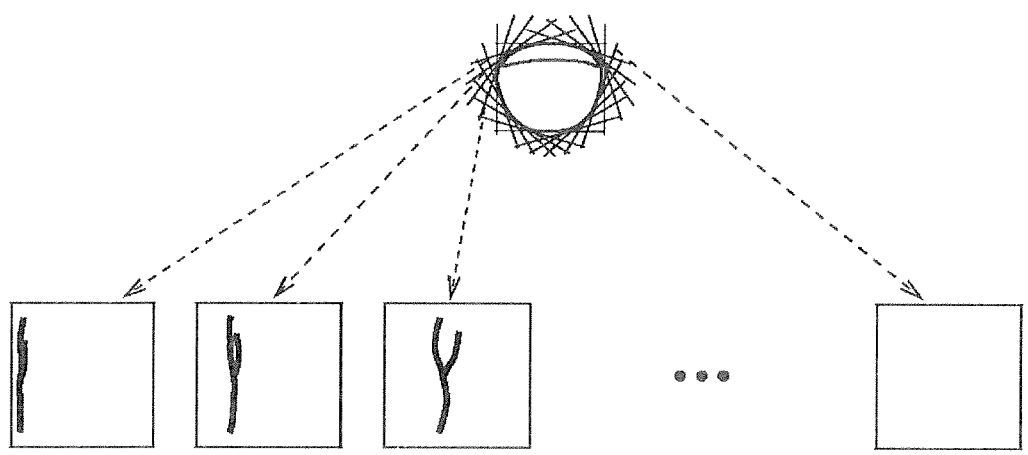
FIG. 4 is a schematic diagram showing the relationship between an image pickup surface and a blood vessel inside an image.

In this state, in a case where, for example, as shown in FIG. 3, the finger is rotated around the finger circumference (the ventral surface, lateral surfaces, and dorsal surface of the finger), the image pickup unit 12 continuously captures images of blood vessels inside the finger around the finger circumference as images from a plurality of viewpoints, for example, as shown in FIG. 4.

The control unit 10 generates, as an image pickup result by the image pickup unit 12, a stereoscopic image of blood vessels in accordance with the images sequentially supplied from the image pickup unit 12, and registers values representing the shape of the stereoscopic image of the blood vessels (hereinafter, these will be referred to as blood vessel shape values) as data to be registered (hereinafter, this will be referred to as registration data) by storing the registration data in the memory 13.

The control unit 10 is configured to be capable of executing the blood vessel registration mode, as described above.

(3) Authentication Mode

Next, the authentication mode will be explained. When determining the authentication mode as a mode to be executed, the control unit 10 changes the operation mode to the authentication mode and causes the notification unit 15 to issue a notification indicating that there is a need to place a finger at an image pickup position and to rotate the finger on the curved ventral surface of the finger. At the same time, the control unit 10 causes the image pickup unit 12 to operate.

The control unit 10 generates, as an image pickup result by the image pickup unit 12, a stereoscopic image of blood vessels in accordance with images sequentially supplied from the image pickup unit 12, and extracts blood vessel shape values of the blood vessels, as in the blood vessel registration mode. The control unit 10 is configured to verify the extracted blood vessel shape values against blood vessel shape values stored as registration data in the memory 13 and to determine, in accordance with the verification result, whether or not the owner of the finger can be approved as a registrant.

Here, if it is determined that the owner of the finger cannot be approved as a registrant, the control unit 10 causes the display section 15a and the sound output section 15b to issue, in a visual and auditory manner, a notification indicating that the owner of the finger cannot be approved as a registrant. Meanwhile, if it is determined that the owner of the finger can be approved as a registrant, the control unit 10 transmits, to an apparatus connected to the interface 14, data indicating that the owner of the finger has been approved as a registrant. This apparatus is triggered by the data indicating that the owner of the finger has been approved as a registrant, and performs, for example, predetermined processing to be performed at the time when authentication is successful, such as closing a door for a certain period of time or cancelling a restricted operation mode.

The control unit 10 is configured to be capable of executing the authentication mode, as described above.

(4) Blood Vessel Shape Value Extraction Process

Figure 5:
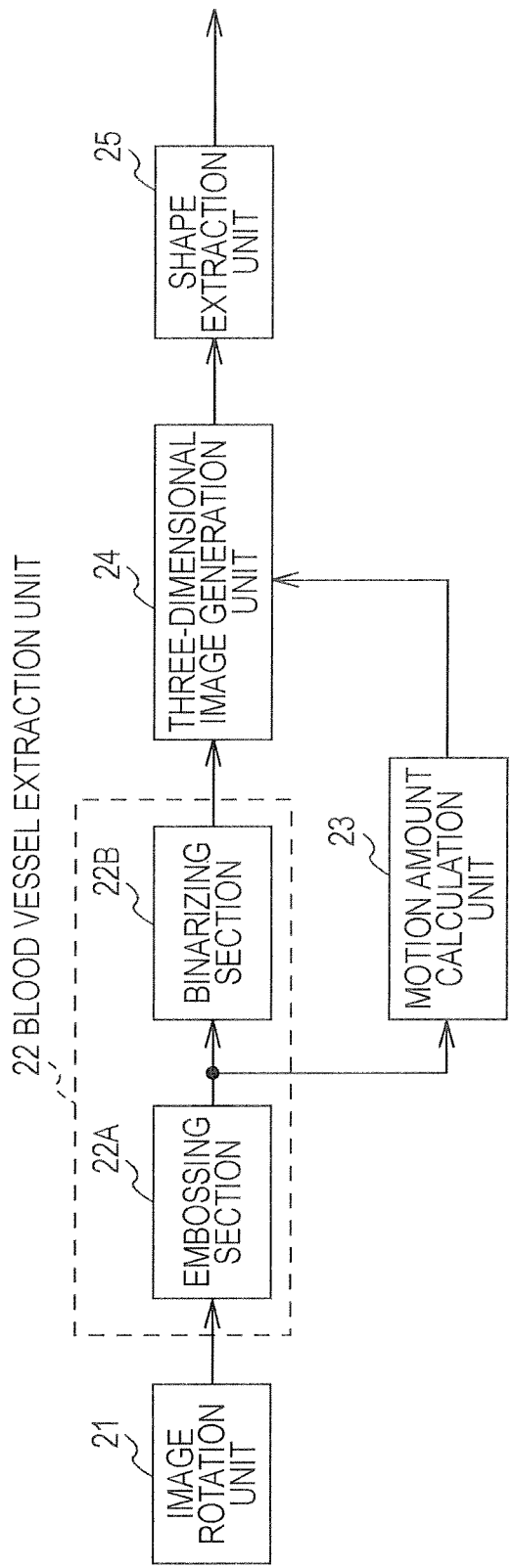
FIG. 5 is a block diagram showing the functional configuration of a control unit.

Next, the details of a blood vessel shape value extraction process by the control unit 10 will be specifically explained. In terms of functions, this process can be divided into an image rotation unit 21, a blood vessel extraction unit 22, a motion amount calculation unit 23, and a three-dimensional image generation unit 24, as shown in FIG. 5. Hereinafter, the image rotation unit 21, the blood vessel extraction unit 22, the motion amount calculation unit 23, and the three-dimensional image generation unit 24 will be explained in detail.

(4-1) Image Rotation Process

The image rotation unit 21 rotates and corrects images from a plurality of viewpoints so that the direction of a finger reflected in the individual images is defined as a reference direction.

An example of a rotation method by the image rotation unit 21 will be explained. The image rotation unit 21 places an optical filter that transmits only visible light at a predetermined position on an optical axis for each period that is different from an image pickup period, and obtains, with a predetermined interval relative to an image of a blood vessel to be captured (hereinafter, this will be referred to as a blood vessel image), an image of a finger to be captured (hereinafter, this will be referred to as a finger image) as a rotation amount to be calculated.

Incidentally, a blood vessel image is an image formed on an image pickup element by using near infrared light as image pickup light, and a finger image is an image formed on an image pickup element by using visible light as image pickup light.

For example, as shown in FIG. 6, in a case where a finger image is obtained (FIG. 6(A)), after extracting the region of a finger reflected in the finger image (FIG. 6(B)), the image rotation unit 21 extracts points constituting the silhouette of the finger (hereinafter, these will be referred to as finger silhouette points) (FIG. 6(C)).

In addition, the image rotation unit 21 extracts, by performing weighting by Hough transform or the like, points corresponding to horizontal silhouette lines as points constituting a knuckle (hereinafter, these will be referred to as knuckle points) from among the finger silhouette points (FIG. 6(D)), and identifies a knuckle portion line (hereinafter, this will be referred to as a knuckle line) JNL in accordance with the knuckle points (FIG. 6(E)).

Then, the image rotation unit 21 obtains the angle θx of the knuckle line JNL with respect to a line LN in a transverse direction in the image as the rotation correction amount for a blood vessel image (FIG. 6(E)), and rotates and corrects each blood vessel image captured until the next finger image is obtained, in accordance with the rotation correction amount.

As a result, in this example, in blood vessel images from a plurality of viewpoints, the longitudinal direction of the finger reflected in the blood vessel images is made the same as the longitudinal direction of the images.

As described above, the image rotation unit 21 performs the image rotation process on a plurality of image data items sequentially received from the image pickup unit 12 as blood vessel images from a plurality of viewpoints continuously captured along the finger circumference, and transmits the image data obtained as the process results to the blood vessel extraction unit 22.

(4-2) Blood Vessel Extraction Process

The blood vessel extraction unit 22 extracts a blood vessel portion reflected in a blood vessel image. An example of an extraction method by the blood vessel extraction unit 22 will be explained. In the blood vessel extraction unit 22, an embossing section 22A performs embossing processing using a differentiation filter, such as a Gaussian filter or a Log filter, on the image data received from the image rotation unit 21 so that blood vessels are embossed on the image.

Now, images before and after embossing processing is performed are shown in FIG. 7. In a blood vessel image before embossing processing is performed (FIG. 7(A)), the boundary between blood vessels and the other portions is vague. Meanwhile, in a blood vessel image after embossing processing is performed (FIG. 7(B)), the boundary becomes clear. As is clear from FIG. 7, blood vessels are highlighted by the embossing processing by the embossing section 21. As a result, blood vessels and the other portions can be clearly distinguished from each other.

In addition, in the blood vessel extraction unit 22, a binarizing section 22B performs binarizing processing on the image data on which blood vessels are embossed with reference to a set brightness so that the image data is converted into a binary blood vessel image (hereinafter, this will be referred to as a binary blood vessel image), and transmits image data obtained as the processing result to the three-dimensional image generation unit 24.

(4-3) Motion Amount Calculation Process

The motion amount calculation unit 23 calculates a motion amount in accordance with blood vessels reflected in blood vessel images from a plurality of viewpoints continuously captured along the finger circumference.

An example of a calculation method by the motion amount calculation unit 23 will be explained. The motion amount calculation unit 23 calculates, in accordance with an optical flow, the amount of motion between corresponding portions in blood vessels reflected in a first blood vessel image received from the blood vessel extraction unit 22 and in a second blood vessel image received from the blood vessel extraction unit 22 prior to reception of the first blood vessel image. Hereinafter, the first blood vessel image will be referred to as the current image, and the second blood vessel image will be referred to as the preceding image.

Figure 8:
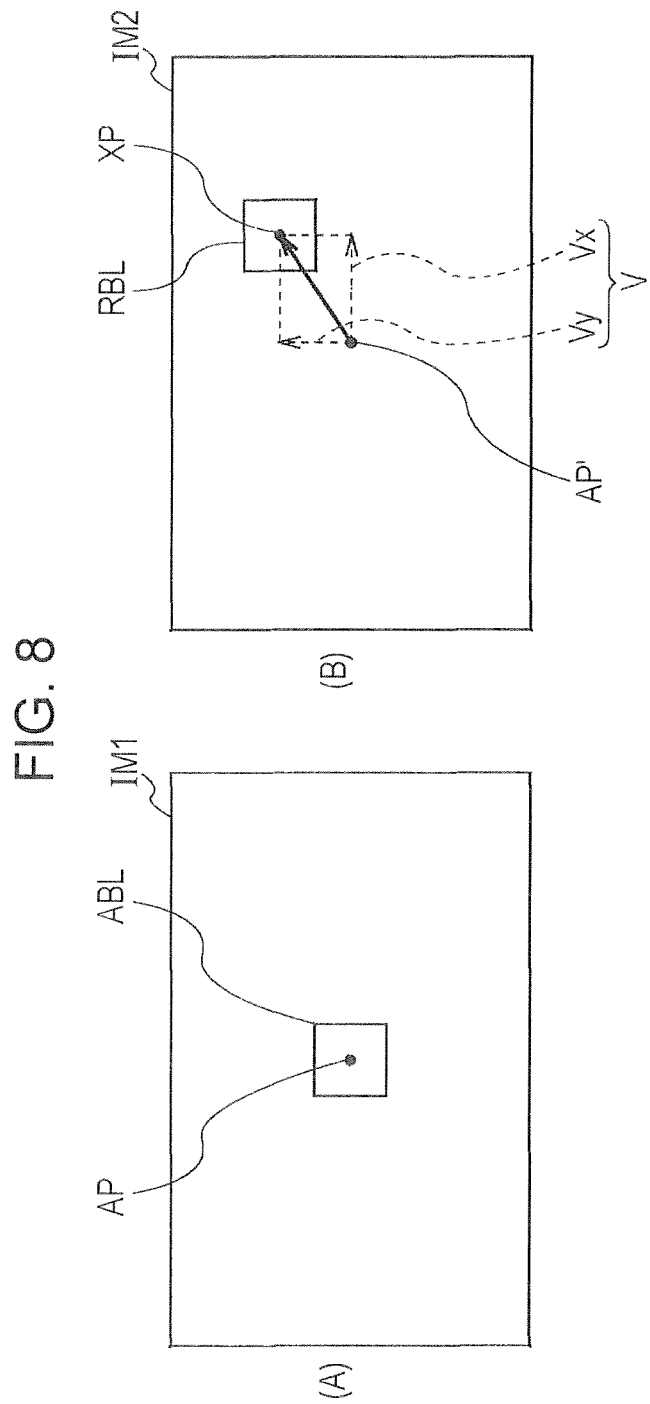
FIG. 8 is a schematic diagram for explaining a motion amount calculation process.

That is, for example, as shown in FIG. 8(A), the motion amount calculation unit 23 determines a point of interest AP in the current image IM1 (hereinafter, this will be referred to as a point of interest), and identifies the brightness of a block ABL of (m×n) pixels centered on the point of interest AP (hereinafter, this will be referred to as a block of interest).

Then, as shown in FIG. 8(B), the motion amount calculation unit 23 searches, from the preceding image IM2, for a block having the brightness that is least different from the brightness in the block of interest ABL, and obtains, by defining the center of a found block RBL as a point XP corresponding to the point of interest AP (hereinafter, this will be referred to as a corresponding point), a position vector ($V_x$,$V_y$) from a position AP' corresponding to the point of interest AP to the corresponding point XP.

The motion amount calculation unit 23 searches, from the preceding image IM2, for blocks corresponding to a plurality of blocks of interest in the current image IM1, as described above. At the same time, the motion amount calculation unit 23 calculates the average of individual position vectors between centers (XP) of the individual blocks and positions (AP') identical to centers of the individual blocks of interest (the average of vector components $V_x$ in the horizontal direction and the average of vector components $V_y$ in the vertical direction) as the motion amount, and transmits the motion amount as data (hereinafter, this will be referred to as motion amount data) to the three-dimensional image generation unit 24.

The motion amount represents a value not only representing motion in a horizontal motion direction (rotation direction) with respect to a face on which the finger is placed but also representing motion in a vertical motion direction (direction orthogonal to the rotation direction) with respect to the face due to a variation in the finger pressure amount, the rotation axis, or the like.

Incidentally, instead of the average of individual position vectors (the average of vector components $V_x$ in the horizontal direction and the average of vector components $V_y$ in the vertical direction), for example, a value (representative value) obtained from the individual position vectors in accordance with a statistical method, such as the maximum value, the minimum value, or the standard deviation of the individual position vectors, may be adopted as the motion amount.

In the motion amount calculation unit 23 in this embodiment, images obtained in the middle of the blood vessel extraction process (images after the embossing processing is performed and before binarization is performed) are adopted as images for which the motion amount is to be calculated.

Figure 9:
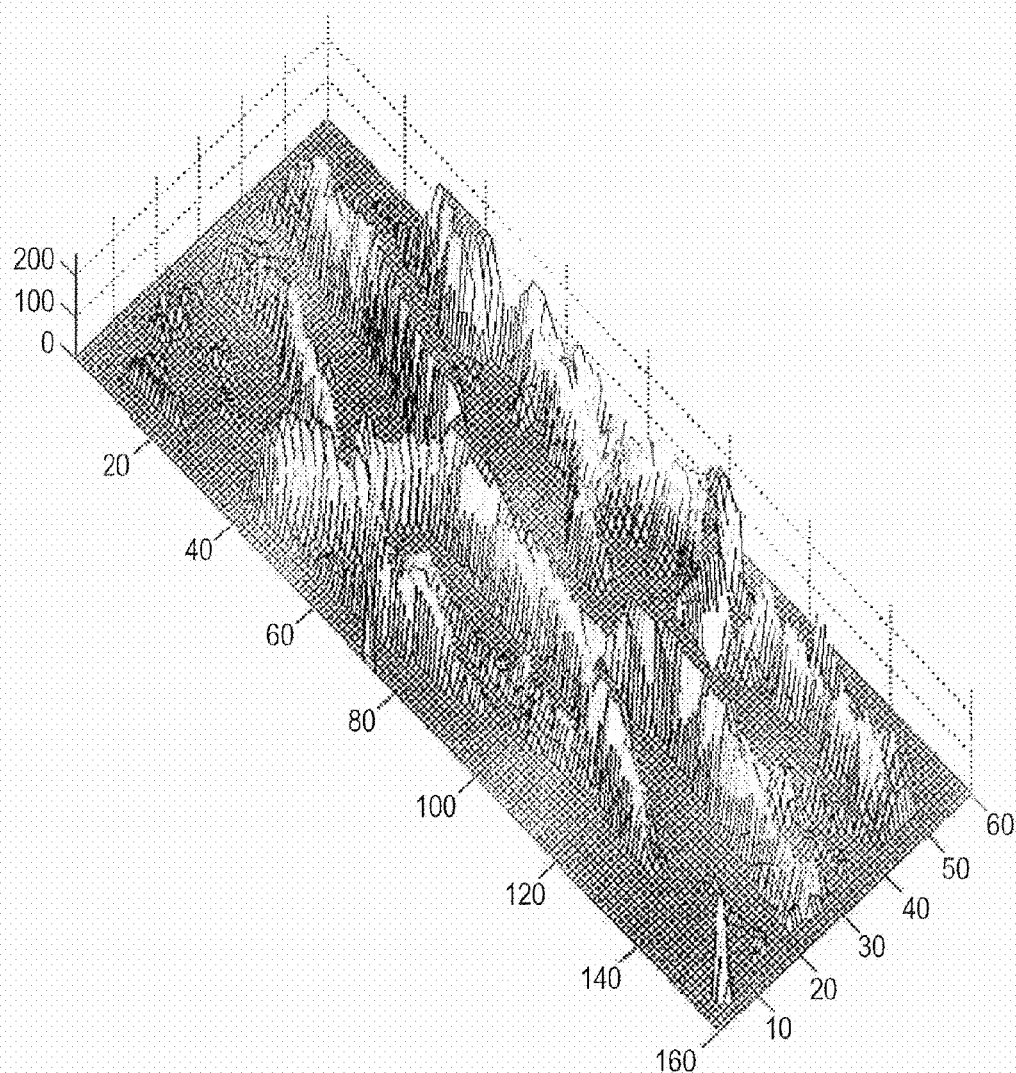
FIG. 9 is a schematic diagram showing the brightness state of a blood vessel in an image after embossing processing is performed.
Figure 10:
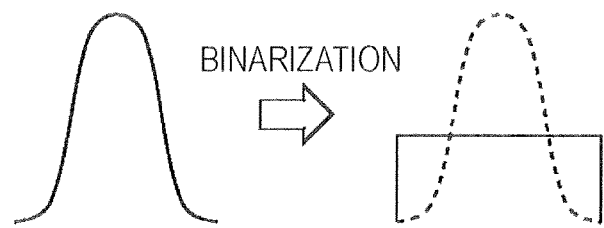
FIG. 10 is a schematic diagram showing the transition of the state of brightness by a blood vessel extraction process.
Figure 11:
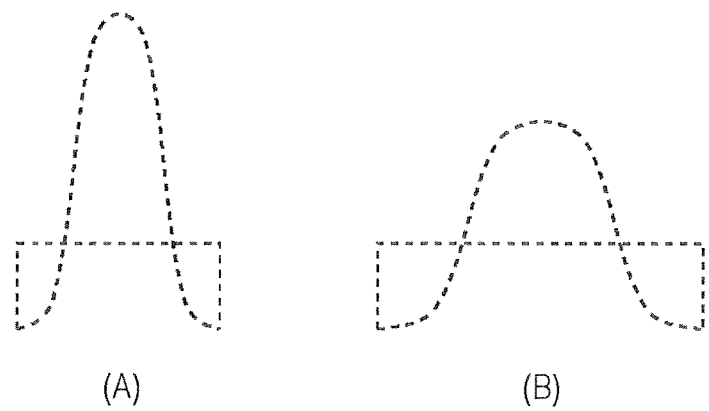
FIG. 11 is a schematic diagram for explaining equalization of the brightness state.

In an image before the blood vessel extraction process is performed (image before the embossing processing is performed), blood vessels and the other portions are clearly distinguished from each other, as described above with reference to FIG. 7. The brightnesses of the blood vessels in the image serve as information indicating the actual cross-section state, as shown in FIG. 9. However, this information is eliminated in an image after the blood vessel extraction process is performed (image after binarizing processing is performed), as shown in FIG. 10. Thus, even if the cross sections of blood vessels different from each other are shown, for example, as shown in FIGS. 11(A) and 11(B), after the extraction process is performed, the different cross sections are likely to be made the same.

Therefore, if an image after the blood vessel extraction process is performed (image after binarizing processing is performed) is adopted as an image for which the amount of displacement is to be calculated, in a case where a block having the brightness that is least different from the brightness of the block of interest ABL in the current image IM1 is searched for from the preceding image IM2 (FIG. 8(B)), many blocks each having a brightness that is equal to or substantially equal to the brightness of the block of interest ABL appear. Thus, a block RBL that truly corresponds to the block of interest ABL cannot be found. As a result, a situation in which the accuracy in the calculation of a displacement amount is reduced may occur.

From the above description, in the motion amount calculation unit 23, images obtained in the middle of the blood vessel extraction process (images after the embossing processing is performed and before binarization is performed) are adopted as images for which a motion amount is to be calculated.

Note that although in general a plurality of blocks of interest in the current image IM1 are all the pixels in the current image IM1, the plurality of blocks of interest may be end points, branch points, or inflection points of blood vessels reflected in the current image IM1, or some of these points.

In addition, although in general an area from which a block having the brightness that is least different from the brightness of the block of interest ABL is searched for corresponds to the entire preceding image IM2, the area may correspond to the size of a plurality of blocks of interest centered on a position displaced by a displace amount detected previously. The shape of the area may be changed in accordance with the amount of temporal change in the displacement amount detected previously.

(4-4) Three-Dimensional Image Generation Process

The three-dimensional image generation unit 24 detects, for individual blood vessel images captured from the circumference of a finger, silhouette regions of blood vessels captured in a projective space in a case where the blood vessels reflected in the individual images are projected from viewpoints of the individual images to the projective space, and extracts a portion common to the individual detected silhouette regions as a stereoscopic image (three-dimensional volume) of the blood vessels.

The three-dimensional image generation unit 24 in this embodiment does not extract a portion common to silhouette regions projected in the deepest area of a projective space as a stereoscopic image of blood vessels. The three-dimensional image generation unit 24 is configured to extract a portion common to silhouette regions projected in an area from the surface of projection in a projective space to a projective plane that is distant from the surface of projection by a predetermined length in the depth direction as a stereoscopic image of blood vessels.

Figure 12:
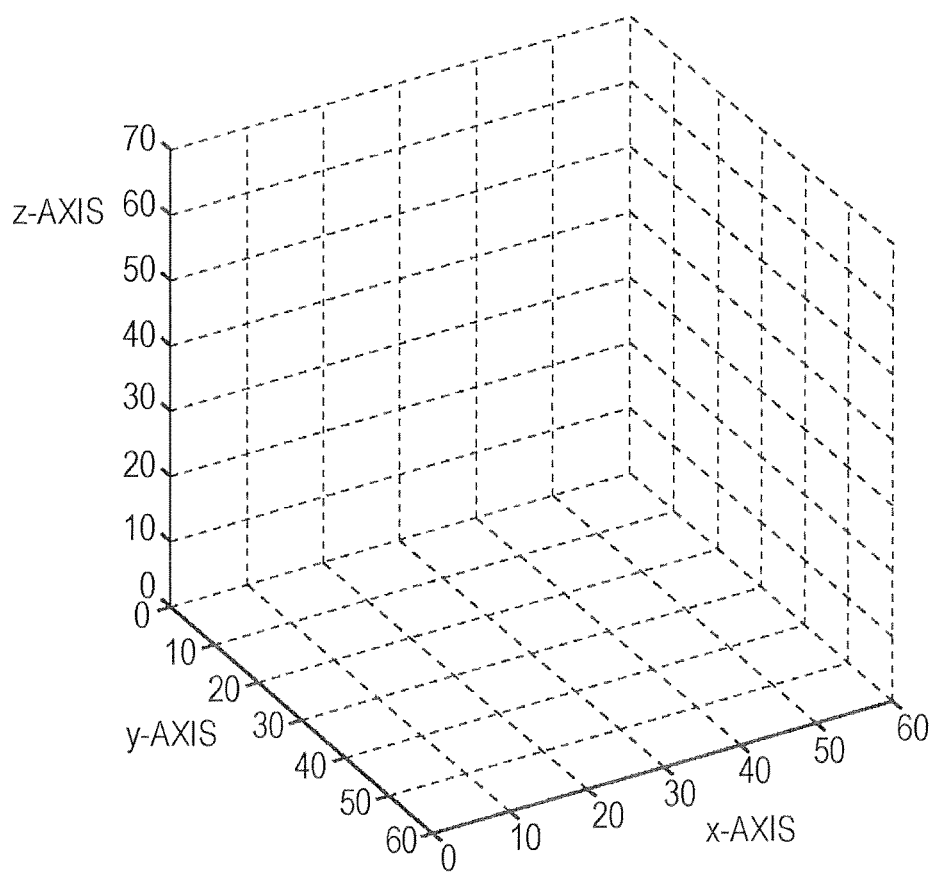
FIG. 12 is a schematic diagram showing a voxel space.

An example of a generation method by the three-dimensional image generation unit 24 will be explained. As shown in FIG. 12, the three-dimensional image generation unit 24 defines, as a projective space, a three-dimensional space having a predetermined shape including cubes called voxels as constitutional units (hereinafter, this will be referred to as a voxel space) (FIG. 13: step SP1).

Then, the three-dimensional image generation unit 24 generates, in accordance with various values, such as the focal length and the image center, stored in the ROM as camera information, a value stored in the ROM as information defining the projective length from the surface of projection in the projective space in the depth direction, and a value of motion amount data received from the motion amount calculation unit 23, shape data of blood vessels from a plurality of image data items (binary blood vessel images) received from the blood vessel extraction unit 22.

Figure 13:
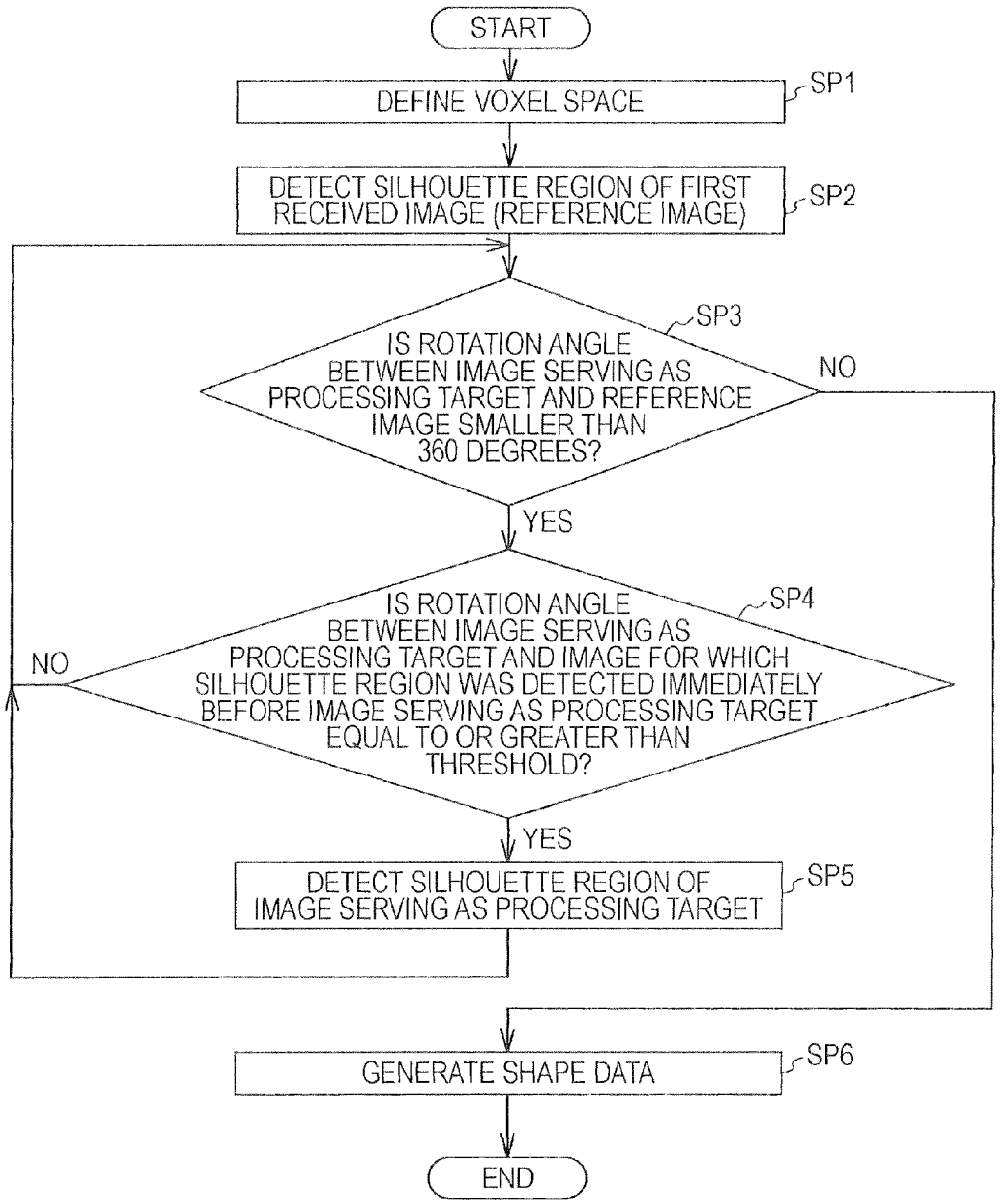
FIG. 13 is a flowchart showing an object-shape generation process.
Figure 14:
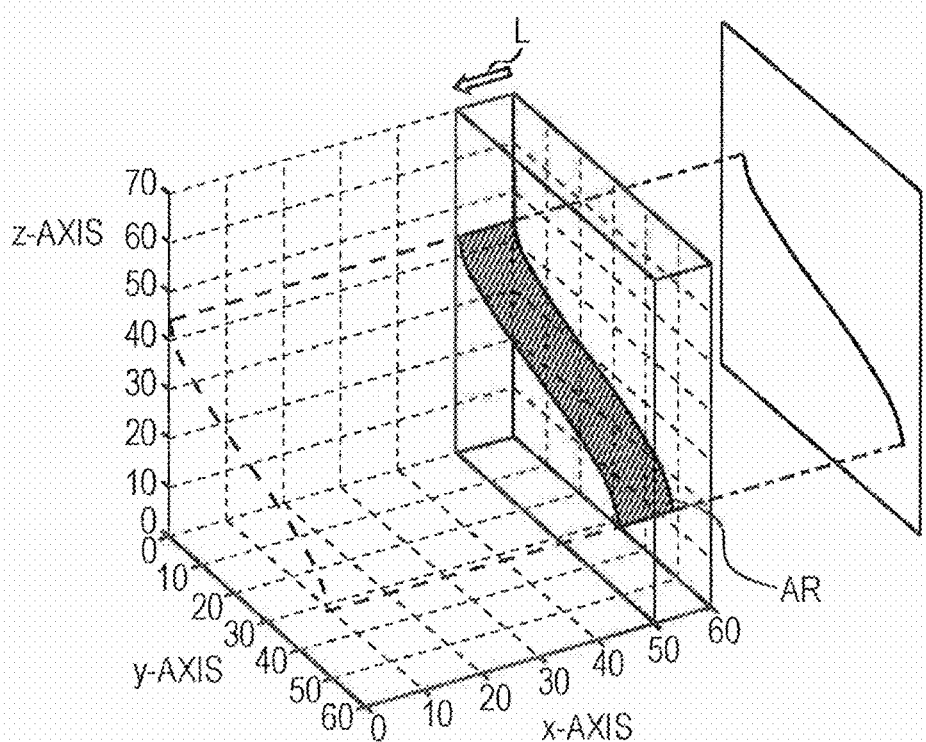
FIG. 14 is a schematic diagram for explaining detection (1) of a silhouette region.

That is, as shown in FIG. 14, the three-dimensional image generation unit 24 places, as a reference image, the binary blood vessel image first received from the blood vessel extraction unit 22 at a position corresponding to a viewpoint having a rotation angle of 0[°] among viewpoints around the voxel space, and detects a silhouette region AR projected in an area from the surface of projection in the projective space to a projective plane that is distant from the surface of projection by a predetermined length L in the depth direction (in FIG. 14, an area surrounded by solid lines) (FIG. 13: step SP2). Incidentally, in FIG. 14, a case where, in the object shown in FIG. 1, FIG. 1(A) represents a reference image is shown by way of example.

In a specific method for detecting a silhouette region, individual voxels in the voxel space are reverse-projected to a reference image so that projected points are calculated, and voxels whose projected points exist within the silhouette of blood vessels reflected in the reference image are caused to remain as a silhouette region.

Meanwhile, for each of the binary blood vessel images secondly and subsequently received from the blood vessel extraction unit 22, the three-dimensional image generation unit 24 identifies a motion amount in a rotation direction from the reference image to a binary blood vessel image serving as the current processing target (hereinafter, this will be referred to as a rotation motion amount), in accordance with motion amount data received from the motion amount calculation unit 23.

Then, the three-dimensional image generation unit 24 calculates the rotation angle $\theta_{ro}$ of the binary blood vessel image serving as the current processing target with respect to the reference image (hereinafter, this will be referred to as a first rotation angle) by using the following equation:

$$\theta_{ro} = \arctan(V_x/r) \quad (1),$$

where the rotation motion amount is represented by $V_x$ and a value set as the distance from the rotation axis of the finger to a blood vessel is represented by r, and determines whether or not the first rotation angle $\theta_{ro}$ is smaller than 360[°] (FIG. 13: step SP3).

In a case where the first rotation angle $\theta_{ro1}$ is smaller than 360[°] (FIG. 13: "YES" in step SP3), this means a state in which all the view volumes (silhouette regions) of a plurality of binary blood vessel images captured from the entire circumference of the finger have not been detected. In this case, the three-dimensional image generation unit 24 calculates a difference between the first rotation angle $\theta_{ro}$ and a rotation angle between the binary blood vessel image for which the view volume was detected immediately before the binary blood vessel image serving as the current processing target and the reference image (hereinafter, this will be referred to as a second rotation angle), and determines whether or not the difference is equal to or greater than a predetermined threshold (FIG. 13: step SP4).

In a case where the difference is smaller than the threshold (FIG. 13: "NO" in step SP4), this means that the rotation of the finger is stopped or in a state equal to stopping. In this case, the three-dimensional image generation unit 24 adopts, as a processing target, the binary blood vessel image to be received immediately after the binary blood vessel image serving as the current processing target, without calculating a silhouette region of the binary blood vessel image serving as the current processing target. The three-dimensional image generation unit 24 is configured to prevent an ineffective silhouette region from being calculated, as described above.

Figure 15:
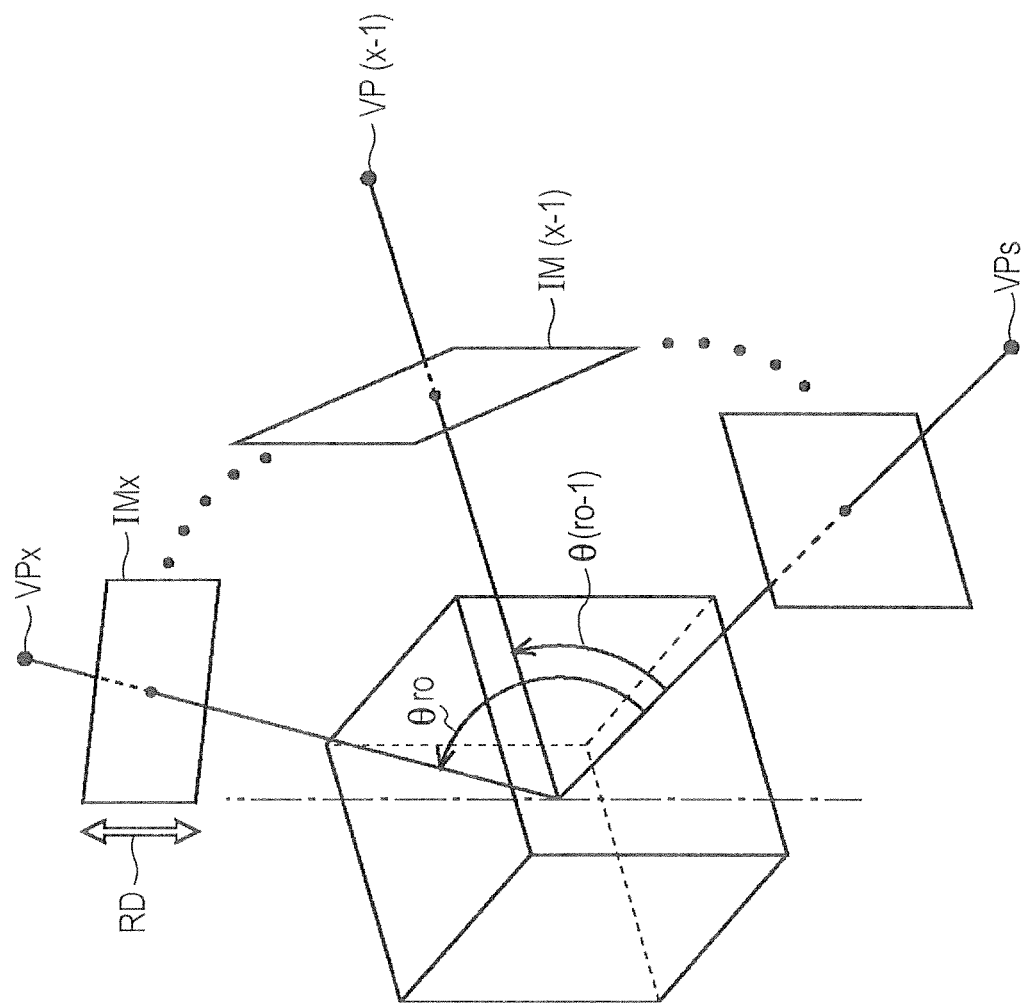
FIG. 15 is a schematic diagram for explaining the positional relationship between individual images placed around a voxel space.

In contrast, in a case where the difference is equal to or greater than the threshold (FIG. 13: "YES" in step SP4), this means a state in which the finger is rotated. In this case, the three-dimensional image generation unit 24 places a binary blood vessel image $IM_X$ serving as the current processing target at a position corresponding to a viewpoint $VP_X$ having the rotation angle $\theta_{ro}$ with respect to a viewpoint $VP_S$ of a reference position $IM_S$, for example, as shown in FIG. 15.

Then, after detecting, for the binary blood vessel image $IM_X$, a silhouette region projected in an area from the surface of projection in the projective space to a projective plane that is distant from the surface of projection by a predetermined length in the depth direction (FIG. 13: step SP5), the three-dimensional image generation unit 24 adopts the binary blood vessel image received immediately after the binary blood vessel image as a processing target.

Note that in a case where the binary blood vessel image $IM_X$ serving as the current processing target is placed around the circumference of the voxel space, the three-dimensional image generation unit 24 identifies, for the binary blood vessel image $IM_X$ and the binary blood vessel image $IM_{(X-1)}$ for which the view volume was detected immediately before the binary blood vessel image $IM_X$, the motion amount in a direction orthogonal to the rotation direction of the finger (the average of vector components $V_y$ in the vertical direction of the binary blood vessel image serving as the current processing target and the binary blood vessel image that was most recently placed) in accordance with motion amount data, and corrects the position of the viewpoint $VP_X$ in a correction direction RD (direction parallel to the Z-axis direction in the voxel space) by the motion amount.

Consequently, even if a variation in the finger pressure amount or the rotation axis occurs at the time of rotation of the finger, the three-dimensional image generation unit 24 is capable of detecting a silhouette region while following the variation. Thus, compared with a case where the motion amount in the direction orthogonal to the rotation direction of the finger is not taken into consideration, the three-dimensional image generation unit 24 can detect a silhouette region accurately.

In this manner, the three-dimensional image generation unit 24 sequentially detects silhouette regions of blood vessels reflected in binary blood vessel images until a binary blood vessel image in which the first rotation angle $\theta_{ro}$ with respect to the reference image is equal to or greater than 360[°] serves as the current processing target (FIG. 13: loop including steps SP3-SP4-SP5).

Figure 16:
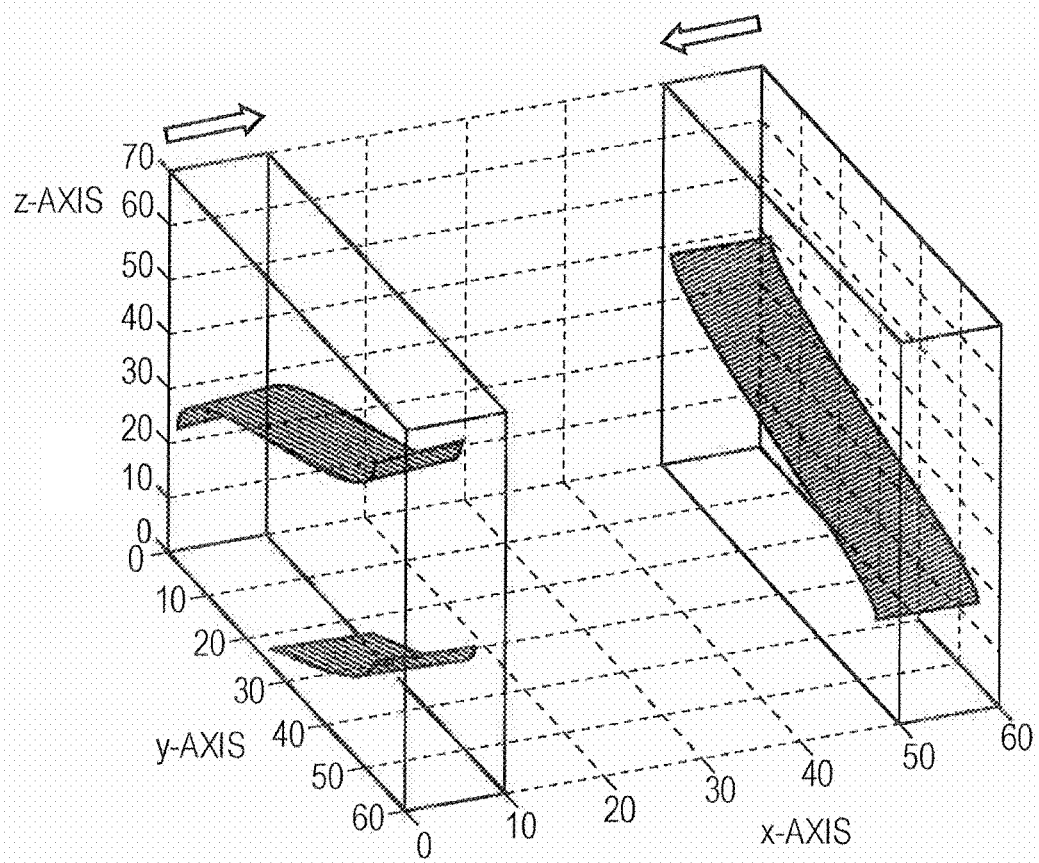
FIG. 16 is a schematic diagram for explaining detection (2) of a silhouette region.

Here, for example, as shown in FIG. 16, silhouette regions are detected within areas from the surface of projection in the voxel space (projective space) to a projective plane that is distant from the surface of projection by a predetermined length in the depth direction (areas surrounded by solid lines).

Thus, in a case where attention is paid to an image on the front side of the object in FIG. 1 (FIG. 1(A)) and an image on the back side of the object (FIG. 1(B)), even if portions in which view volumes are not the same exist in the voxel space, voxels of projection portions (silhouette regions) of the object in the individual images remain.

Figure 17:
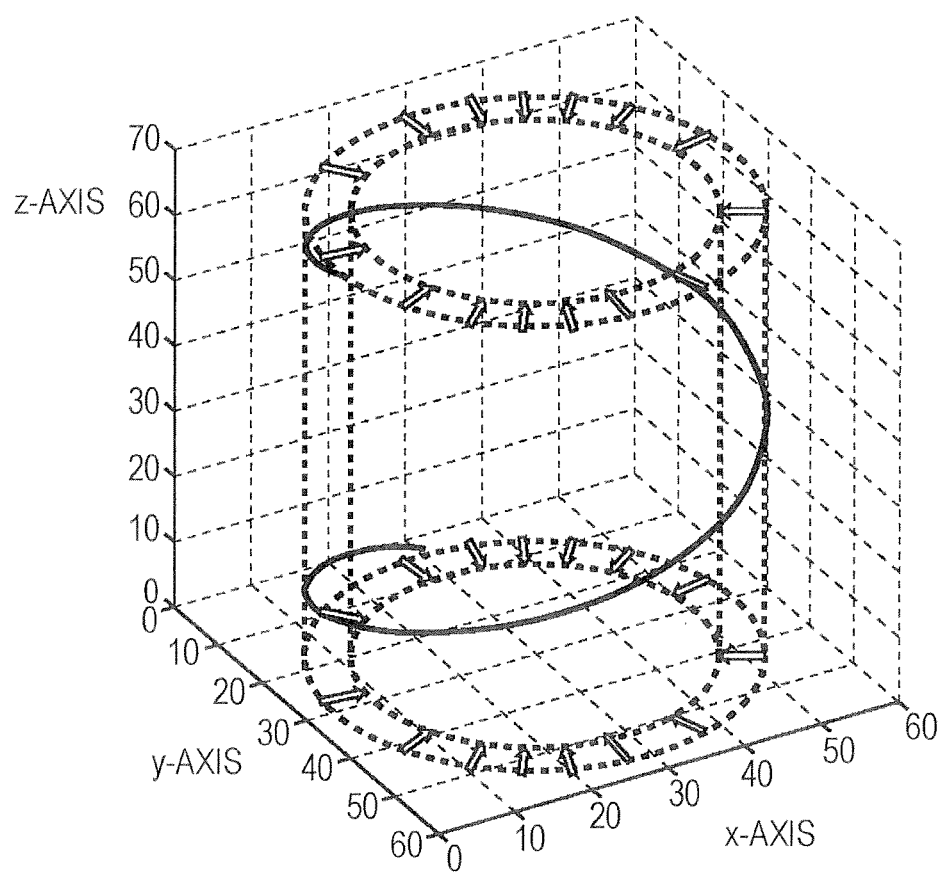
FIG. 17 is a schematic diagram showing the extraction state of a silhouette region.

Therefore, in a case where a binary blood vessel image in which the first rotation angle $\theta_{ro}$ with respect to the reference image is equal to or greater than 360[°] serves as the current processing target, in the voxel space, for example, as shown in FIG. 17, a common portion (solid line portion) of voxels remaining as projection portions (silhouette regions) of the object in the individual images is expressed as a true stereoscopic image (three-dimensional volume) of blood vessels of the actual object. Incidentally, in FIG. 16, a column region portion represents voxles remaining as a non-projection portion.

In a case where a binary blood vessel image in which the first rotation angle $\theta_{ro}$ with respect to the reference image is equal to or greater than 360[°] serves as the current processing target, the three-dimensional image generation unit 24 identifies voxels having the common portion as a stereoscopic image of blood vessels, and extracts voxel data as data of the stereoscopic image. The voxel data is registered as registration data in the memory 13 in the blood vessel registration mode, and is verified against registration data registered in the memory 13 in the authentication mode.

(5) Operation and Effect

With the configuration described above, the control unit 10 (the three-dimensional image generation unit 24) in the authentication apparatus 1 sequentially receives a plurality of binary blood vessel images captured from the circumference of a finger and obtained when blood vessels in the captured images are extracted.

In addition, the three-dimensional image generation unit 24 detects, for the individual binary blood vessel images, projection regions projected in an area from the surface of projection in a voxel space to a projective plane that is distant from the surface of projection by a predetermined length in the depth direction in a case where an object reflected in the individual images is projected to the voxel space from viewpoint positions of the individual images (for example, see FIG. 14), and extracts a portion common to the individual detected projection regions (see FIG. 17).

The three-dimensional image generation unit 24 does not extract a portion common to silhouette regions projected in the deepest area of the voxel space as a stereoscopic image of blood vessels. The three-dimensional image generation unit 24 extracts a portion common to silhouette regions projected to an area from the surface of projection in the voxel space to a projective plane that is distant from the surface of projection by a predetermined length in the depth direction as a stereoscopic image of blood vessels. Thus, the view volume can be calculated while attention is paid to an area corresponding to the depth from the surface of the finger to an image pickup target (blood vessel) inside the finger.

Consequently, even in a case where view volumes are not the same among regions from the surface of a blood vessel to the opposite side, as long as view volumes near the surface of the blood vessel are the same, the three-dimensional image generation unit 24 causes the common portion to remain as voxels of a projection portion (silhouette region) of the blood vessel. In this manner, even in a case where a blood vessel portion existing on the back side of an image pickup surface cannot be projected, the shape that truly reflects the actual blood vessel can be expressed (for example, see FIG. 15).

With the configuration described above, since a portion common to silhouette regions projected in an area from the surface of projection in a projective space to a projective plane that is distant from the surface of projection by a predetermined length in the depth direction is extracted as a stereoscopic image of a blood vessel, the authentication apparatus 1 that is capable of generating the shape of a blood vessel with high accuracy even in a situation in which an image of the back side of the blood vessel cannot be captured, can be realized.

(6) Other Embodiments

In the embodiment described above, a case where a blood vessel inside a living body is used as an image pickup target has been described. However, the present invention is not limited to this. For example, a nerve or a fingerprint, the face, or the like on the surface of a living body may be used as an image pickup target. Alternatively, an object other than a living body may be used. Note that embossing processing may be omitted in an appropriate manner in accordance with an image pickup target used.

In addition, in a case where an image pickup target inside a living body, such as a nerve or a blood vessel, is used, although a case where a finger is used as a living body portion has been described in the foregoing embodiment, the present invention is not limited to this. For example, a portion, such as the palm of a hand, a toe, an arm, an eye, or an arm, may be used as a living body portion.

In addition, although projection regions to be detected, the projection regions being projected in a projective space in a case where an object reflected in images is projected to the projective space from viewpoint positions of the individual images, are fixed in the foregoing embodiment, the present invention may vary the projection regions to be detected.

That is, in the foregoing embodiment, a value (fixed value) representing a projective length from the surface of projection in the projective space in the depth direction is stored in the ROM. However, instead of this, for example, information representing the correspondence between the body fat percentage and the projective length is stored.

Prior to detecting a silhouette region of the first received image (reference image) (FIG. 13: step SP2), the control unit 10 causes the notification unit 15 to issue an instruction to enter the body fat percentage of a user whose image is to be captured. Then, the control unit 10 detects the body fat percentage entered from the operation unit 11, and sets a value corresponding to the detected body fat percentage. Accordingly, the control unit 10 changes the projective length.

By performing the processing described above, in a case where a silhouette region projected in an area from the surface of projection in a voxel space to a projective plane that is distant from the surface of projection by a predetermined length in the depth direction is detected, for a blood vessel which is likely to become more difficult to project as the body fat percentage increases, the view volume can be obtained while attention is paid to a region corresponding to the depth from the surface of a finger to an image pickup target (blood vessel) inside the finger, irrespective of an individual difference in the body fat percentage. Thus, the shape that more truly reflects the actual blood vessel can be expressed.

Note that instead of entering the body fat percentage of a user whose image is to be captured, information on the living body, such as the height, weight, and age, may be entered so that the body fat percentage can be calculated from the entered information. A set value may be associated with various factors, such as the finger diameter and the weight, as well as the body fat percentage.

In addition, for example, instead of a value representing the projective length in the depth direction from the surface of projection in the projective space, information representing the correspondence between a viewpoint and a value representing the projective length is stored in the ROM. Prior to detecting a silhouette region of the first received image (reference image) (FIG. 13: step SP2), the control unit 10 detects a viewpoint corresponding to a blood vessel image in accordance with the finger width of a finger silhouette reflected in a blood vessel image, information on the inside of the finger silhouette reflected in a finger image, and the like, and sets a value corresponding to the detected viewpoint. Accordingly, the control unit 10 changes the projective length.

By performing the processing described above, in a case where a silhouette region projected in an area from the surface of projection in a voxel space to a projective plane that is distant from the surface of projection by a predetermined length in the depth direction is detected, a projective length corresponding to the depth from the surface of the finger to a position at which a blood vessel exists can be set for each of the dorsal side of the finger and the ventral side of the finger. Hence, the shape that more truly reflects the actual blood vessel can be expressed.

As described above, prior to detection of a silhouette region of the first received image (reference image), a setting step of detecting information on an image pickup target and setting a predetermined length corresponding to the detected information is provided, and a projection region projected in an area from the surface of projection in a projective space to a projective plane that is distant from the surface of projection by the predetermined length set in the setting step in the depth direction is detected. Therefore, the shape of a blood vessel can be generated with higher accuracy.

Furthermore, although a case where the blood vessel registration mode and the authentication mode are executed in accordance with a program stored in the ROM has been described in the foregoing embodiment, the present invention is not limited to this. The blood vessel registration mode and the authentication mode may be executed in accordance with a program acquired by being installed from a program storage medium, such as a CD (Compact Disc), a DVD (Digital Versatile Disc), or a semiconductor memory, or being downloaded from a program providing server on the Internet.

Furthermore, although a case where the control unit 10 performs registration processing and authentication processing has been described in the foregoing embodiment, the present invention is not limited to this. Part of the processing may be performed by a graphics workstation.

Furthermore, a case where the authentication apparatus 1 that has an image pickup function, a verification function, and a registration function is used has been described in the foregoing embodiment, the present invention is not limited to this. The present invention may be applied to an embodiment in which each function or part of each function is assigned to a corresponding single apparatus in accordance with the application.

INDUSTRIAL APPLICABILITY

The present invention is useful in the area of biometrics authentication.

EXPLANATION OF REFERENCE NUMERALS

1: authentication apparatus, 10: control unit, 11: operation unit, 12: image pickup unit, 13: memory, 14: interface, 15: notification unit, 15a: display section, 15b: sound output section, 21: image rotation unit, 22A: embossing section, 22B: binarizing section, 23: motion amount calculation unit, 24: three-dimensional image generation unit, 25: shape extraction unit

The invention claimed is:

1. An object-shape generation method, comprising:
in an apparatus:
capturing a plurality of images of a first object within a second object using near infrared light rays;
capturing a plurality of images of the second object using visible light rays;
extracting a plurality of silhouette points of the second object from the plurality of images on the second object;
determining a set of reference points from the plurality of extracted silhouette points;
detecting an angle of the set of reference points in relation to a reference line in a transverse direction of the plurality of images of the second object;
aligning one or more of the plurality of images of the first object with the plurality of images of the second object based on the detected angle;
detecting a plurality of projection regions of the first object when individual images of the plurality of images of the first object are projected to a projective space from different viewpoints of the individual images, the individual images being captured from a circumference of the second object;
wherein the projection regions are projected in an area from a surface of projection in the projective space to a projective plane that is distant from the surface of projection by a predetermined length in a depth direction; and
extracting a common portion of the plurality of detected projection regions.

2. The object-shape generation method according to claim 1, further comprising:
calculating, from one of the individual images, an amount of movement in a rotation direction of the first object in an image captured prior to the one of the individual images, wherein the calculating comprises:
obtaining a rotation angle of a detection target image with respect to a reference image from an amount of movement between the reference image and the detection target image; and
detecting a projection region of the plurality of projection regions when the first object in the detection target image is projected to the projective space from a viewpoint position having the rotation angle with respect to a viewpoint position of the reference image.

3. The object-shape generation method according to claim 1, further comprising:
calculating, from one of the individual images, a movement amount in a direction orthogonal to a rotation direction of the first object in an image captured prior to the one of the individual images; and
correcting a viewpoint position of the one of the individual images in a correction direction by the movement amount.

4. The object-shape generation method according to claim 1, further comprising:
detecting information on an image pickup target;
setting the predetermined length based on the detected information; and
detecting the plurality of projection regions projected in an area from a surface of projection in the projective space to a projective plane that is distant from the surface of projection by a set predetermined length in a depth direction.

5. The object-shape generation method according to claim 1, further comprising storing, in a memory, a value representing the predetermined length from the surface of projection in the projective space in the depth direction.

6. The object-shape generation method according to claim 1, further comprising performing embossing processing on each of the plurality of images of the first object using a differentiation filter to emboss the first object on each of the plurality of images of the first object.

7. The object-shape generation method according to claim 6, further comprising converting each of a plurality of embossed images into a binary image with reference to a set brightness.

8. An object-shape generation apparatus comprising:
a work memory; and
an image processing unit that executes image processing by using the work memory, wherein the image processing unit comprises one or more processors operable to:
capture a plurality of images of a first object within a second object using near infrared light rays;
capture a plurality of images of the second object using visible light rays;
extract a plurality of silhouette points of the second object from the plurality of images of the second object;
determine a set of reference points from the plurality of extracted silhouette points;
detect an angle of the set of reference points in relation to a reference line in a transverse direction of the plurality of images of the second object align one or more of the plurality of images of the first object with the plurality of images of the second object based on the detected angle;
detect a plurality of projection regions of the first object when individual images of the plurality of images of the first object are projected to a projective space from different viewpoints of the individual images, the individual images being captured from a circumference of the second object;
wherein the projection regions are projected in an area from a surface of projection in the projective space to a projective plane that is distant from the surface of projection by a predetermined length in a depth direction; and
extract a common portion of the plurality of detected projection regions.

9. A non-transitory computer-readable medium having stored thereon a computer program having at least one code section for communication, the at least one code section being executable by a computer for causing the computer to perform steps comprising:
capturing a plurality of images of a first object within a second object using near infrared light rays;
capturing a plurality of images of the second object using visible light rays;
extracting a plurality of silhouette points of the second object from the plurality of images of the second object;
determining a set of reference points from the plurality of extracted silhouette points;
detecting an angle of the set of reference points in relation to a reference line in a transverse direction of the plurality of images of the second object;
aligning one or more of the plurality of images of the first object with the plurality of images of the second object based on the detected angle;
detecting a plurality of projection regions of the first object when individual images of the plurality of images of the first object are projected to a projective space from different viewpoints of the individual images, the individual images being captured from a circumference of the second object;
wherein the projection regions are projected in an area from a surface of projection in the projective space to a projective plane that is distant from the surface of projection by a predetermined length in a depth direction; and
extracting a common portion of the plurality of detected projection regions.

* * * * *